United States Patent
Danivas et al.

(10) Patent No.: US 12,289,255 B2
(45) Date of Patent: Apr. 29, 2025

(54) SYSTEMS AND METHODS FOR USING A PACKET PROCESSING PIPELINE CIRCUIT TO EXTEND THE CAPABILITIES OF RATE LIMITER CIRCUITS

(71) Applicant: Pensando Systems Inc., Milpitas, CA (US)

(72) Inventors: Vishwas Danivas, Santa Clara, CA (US); Murty Subba Rama Chandra Kotha, San Jose, CA (US); Tuyen Quoc, Saratoga, CA (US); Hui Peng, Cupertino, CA (US); Kit Chiu Chu, Fremont, CA (US)

(73) Assignee: Pensando Systems Inc., Milpitas, CA (US)

( * ) Notice: Subject to any disclaimer, the term of this patent is extended or adjusted under 35 U.S.C. 154(b) by 358 days.

(21) Appl. No.: 17/985,093

(22) Filed: Nov. 10, 2022

(65) Prior Publication Data
US 2024/0163230 A1 May 16, 2024

(51) Int. Cl.
*H04L 49/00* (2022.01)
*H04L 47/215* (2022.01)
*H04L 47/25* (2022.01)
*H04L 47/625* (2022.01)

(52) U.S. Cl.
CPC ........ *H04L 49/3063* (2013.01); *H04L 47/215* (2013.01); *H04L 47/25* (2013.01); *H04L 47/6255* (2013.01)

(58) Field of Classification Search
CPC ... H04L 49/3063; H04L 47/215; H04L 47/25; H04L 47/6255
See application file for complete search history.

(56) References Cited

U.S. PATENT DOCUMENTS

| | | | |
|---|---|---|---|
| 9,319,351 B1* | 4/2016 | Orr | H04L 45/745 |
| 9,450,881 B2 | 9/2016 | Dumitrescu et al. | |
| 9,742,668 B1 | 8/2017 | Mackie et al. | |
| 10,505,861 B1* | 12/2019 | Li | H04L 43/16 |
| 10,789,199 B2 | 9/2020 | Mundkur et al. | |
| 10,979,353 B2* | 4/2021 | Bosshart | H04L 45/74 |
| 11,388,078 B1* | 7/2022 | Sommers | H04L 43/50 |

(Continued)

OTHER PUBLICATIONS

P4, "P416 Language Specification", version 1.2.2, The P4 Language Consortium, May 17, 2021, 170 pgs.

(Continued)

*Primary Examiner* — Hoang-Chuong Q Vu

(57) ABSTRACT

The rate limiter circuits in the packet processing chip of a NIC are a limited hardware resource that may limit the number of workloads that can be run on a server. Some such chips include an egress packet processing pipeline circuit and a second packet processing pipeline circuit that prepares work for the egress pipeline circuit. Some of the stages of the second pipeline circuit can be configured as a first limiter and a second limiter that implement aspects of different rate limiters such as IOPS limiters, bandwidth limiters, etc. Another pipeline stage can use the outputs of the different rate limiters to make a limiting decision that is written into one of the rate limiter circuits. The second pipeline circuit is thereby implementing virtualized rate limiters where one of the rate limiter circuits performs the rate limiting for the virtualized rate limiters.

20 Claims, 15 Drawing Sheets

(56) References Cited

U.S. PATENT DOCUMENTS

2012/0063353 A1\* 3/2012 Schlenk ................. H04L 47/10
370/437
2021/0288910 A1\* 9/2021 Daly ...................... H04L 47/24

OTHER PUBLICATIONS

P4, "P4 Language Tutorial", 2017, 55 pgs.
Sivaraman, Anirudh et al. "DC.p4: Programming the Forwarding Plane of a Data-Center Switch", 2015, 8 pgs.

\* cited by examiner

SYSTEMS AND METHODS FOR USING A PACKET PROCESSING PIPELINE CIRCUIT TO EXTEND THE CAPABILITIES OF RATE LIMITER CIRCUITS

TECHNICAL FIELD

The embodiments relate to computer networks, local area networks, network appliances such a router, a switch, a network interface card (NIC), a smartNIC, and a distributed service card (DSC). The embodiments also relate to elements of network appliances such as semiconductor chips implementing packet processing pipeline circuits, metering circuits, and rate limiter circuits.

BACKGROUND

Network appliances process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of network appliances has been defined in the "$P4_{16}$ Language Specification," version 1.2.2, as published by the P4 Language Consortium on May 17, 2021. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads because they offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a system. The system can include a first packet processing pipeline circuit that produces a plurality of network packets for a workload, a second packet processing pipeline circuit that includes a plurality of match-action processing stages arranged as a match-action pipeline, a logical interface (LIF) that includes a LIF queue that stores a plurality of transmission requests for transmission of the network packets for the workload, a scheduler that schedules one of the transmission requests for processing by scheduling a transmission request (TR) packet header vector (PHV) for processing by the second packet processing pipeline circuit, a first limiter that is implemented by the second packet processing pipeline circuit and that produces a first limiting indicator by processing the TR PHV, a second limiter that is implemented by the second packet processing pipeline circuit and that produces a second limiting indicator by processing the TR PHV, a rate limit calculator that produces a rate limiting decision from the first limiting indicator and the second limiting indicator, and a rate limiter circuit that, based on the rate limiting decision, causes the scheduler to limit scheduling of TR PHVs based on the transmission requests from the workload, wherein the first packet processing pipeline circuit produces the network packets at a rate governed by the second packet processing pipeline circuit.

Another aspect of the subject matter described in this disclosure can be implemented by a method. The method can include queueing a plurality of transmission requests for transmission of a plurality of network packets for a workload, scheduling one of the transmission requests for processing by scheduling a TR PHV for processing by a second packet processing pipeline circuit that implements a first limiter and a second limiter, using the first limiter and the second limiter to produce a first limiting indicator and a second limiting indicator by processing the TR PHV, using the first limiting indicator and the second limiting indicator to produce a rate limiting decision, using a first packet processing pipeline circuit to produce the network packets for the workload, and rate limiting production of network packets for the workload based on the rate limiting decision, wherein a rate limiter circuit causes the scheduler to rate limit production of the network packets for the workload based on the rate limiting decision.

Yet another aspect of the subject matter described in this disclosure can be implemented in a system. The system can include a means for queueing a plurality of transmission requests for transmission of a plurality of network packets for a workload, a scheduling means for scheduling TR PHVs that are based on the transmission requests, a first packet processing means that processes the TR PHVs using a plurality of rate metering means that produce a plurality of indicator means for indicating a need for rate limiting network packet production for the workload, a decision means that uses the indicator means to produce a decision indication means for indicating whether production of the network packets for the workload is to be rate limited, a hardware rate limiting means for governing production of the network packets based on decision indication means, and a second packet processing means for producing the network packets.

In some implementations of the methods and devices, the system further includes a first token bucket that indicates availability of a first networking resource for the workload, and a second token bucket that indicates availability of a second networking resource for the workload, wherein the first limiter uses the first token bucket to produce the first limiting indicator, and wherein the second limiter uses the second token bucket to produce the second limiting indicator. In some implementations of the methods and devices, the system further includes a metering circuit that adds tokens to the first token bucket at a first predetermined rate and adds tokens to the second token bucket at a second predetermined rate. In some implementations of the methods and devices, the second packet processing pipeline circuit removes tokens from the first token bucket based on consumption of the first network resource by the workload, and the second packet processing pipeline circuit removes tokens from the second token bucket based on consumption of the second network resource by the workload.

In some implementations of the methods and devices, the system further includes a central processing unit (CPU) that configures the second packet processing pipeline circuit to implement the first limiter, the second limiter, and the rate limit calculator. In some implementations of the methods and devices, the second packet processing pipeline circuit includes a first match-action processing stage circuit, a second match-action processing stage circuit, and a third match-action processing stage circuit, the first match-action processing stage circuit implements the first limiter and adds the first limiting indicator to the TR PHV, the second match-action processing stage circuit implements the second limiter and adds the second limiting indicator to the TR PHV, and the third match-action processing stage circuit implements the rate limit calculator. In some implementations of the methods and devices, a fourth match-action processing stage of the second packet processing pipeline circuit writes rate limiting data from the rate limiting decision into the rate limiter circuit. In some implementations of the methods and devices, the first limiter or the second limiter is an input/output operations per second (IOPS) rate limiter and the first limiter or the second limiter is a bandwidth limiter.

In some implementations of the methods and devices, the first packet processing pipeline circuit, the second packet processing pipeline circuit, and the rate limiter circuit are special purpose circuits in one or more semiconductor chips. In some implementations of the methods and devices, the system further includes a network interface card (NIC) that includes the one or more semiconductor chips and a peripheral component interface express (PCIe) interface, wherein the NIC is adapted for installation in a host computer, and wherein the workload is a process running on the host computer that uses the PCIe interface to write the transmission requests into the LIF. In some implementations of the methods and devices, the NIC uses single root input/output virtualization (SR-IOV) to implement a virtual function (VF), and the workload is a virtual machine (VM) running on the host computer that uses the VF to write the transmission requests into the LIF. In some implementations of the methods and devices, the NIC includes a memory that is outside of the one or more semiconductor chips and that stores a plurality of token buckets and the LIFs, a first one of the token buckets indicates availability of a first networking resource for the workload, a second one of the token buckets indicates availability of a second networking resource for the workload, the first limiter uses the one of the token buckets to produce the first limiting indicator, and the second limiter uses the second one of the token buckets to produce the second limiting indicator. In some implementations of the methods and devices, the one or more semiconductor chips include a metering circuit, and the metering circuit adds tokens to the token buckets at predetermined rates. In some implementations of the methods and devices, the rate limiting circuit is one of a limited number of rate limiting circuits in a semiconductor chip.

In some implementations of the methods and devices, a first token bucket indicates availability of a first networking resource for the workload, a second token bucket indicates availability of a second networking resource by the workload, the first limiter uses the first token bucket to produce the first limiting indicator, and the second limiter uses the second token bucket to produce the second limiting indicator. In some implementations of the methods and devices, a metering circuit adds tokens to the first token bucket at a first predetermined rate, the metering circuit adds tokens to the second token bucket at a second predetermined rate, the second packet processing pipeline circuit removes tokens from the first token bucket based on consumption of the first network resource by the workload, and the second packet processing pipeline circuit removes tokens from the second token bucket based on consumption of the second network resource by the workload. In some implementations of the methods and devices, the second packet processing pipeline circuit includes a first match-action processing stage circuit, a second match-action processing stage circuit, and a third match-action processing stage circuit, the first match-action processing stage circuit implements the first limiter and adds the first limiting indicator to the TR PHV, the second match-action processing stage circuit implements the second limiter and adds the second limiting indicator to the TR PHV, and the third match-action processing stage circuit implements a rate limit calculator that produces the rate limiting decision. In some implementations of the methods and devices, the system further includes a first leaky bucket means for indicating availability of a first network resource for the workload, and a second leaky bucket means for indicating availability of a second network resource for the workload, wherein the plurality of rate metering means uses the first leaky bucket means and the second leaky bucket means to produce the plurality of indicator means.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
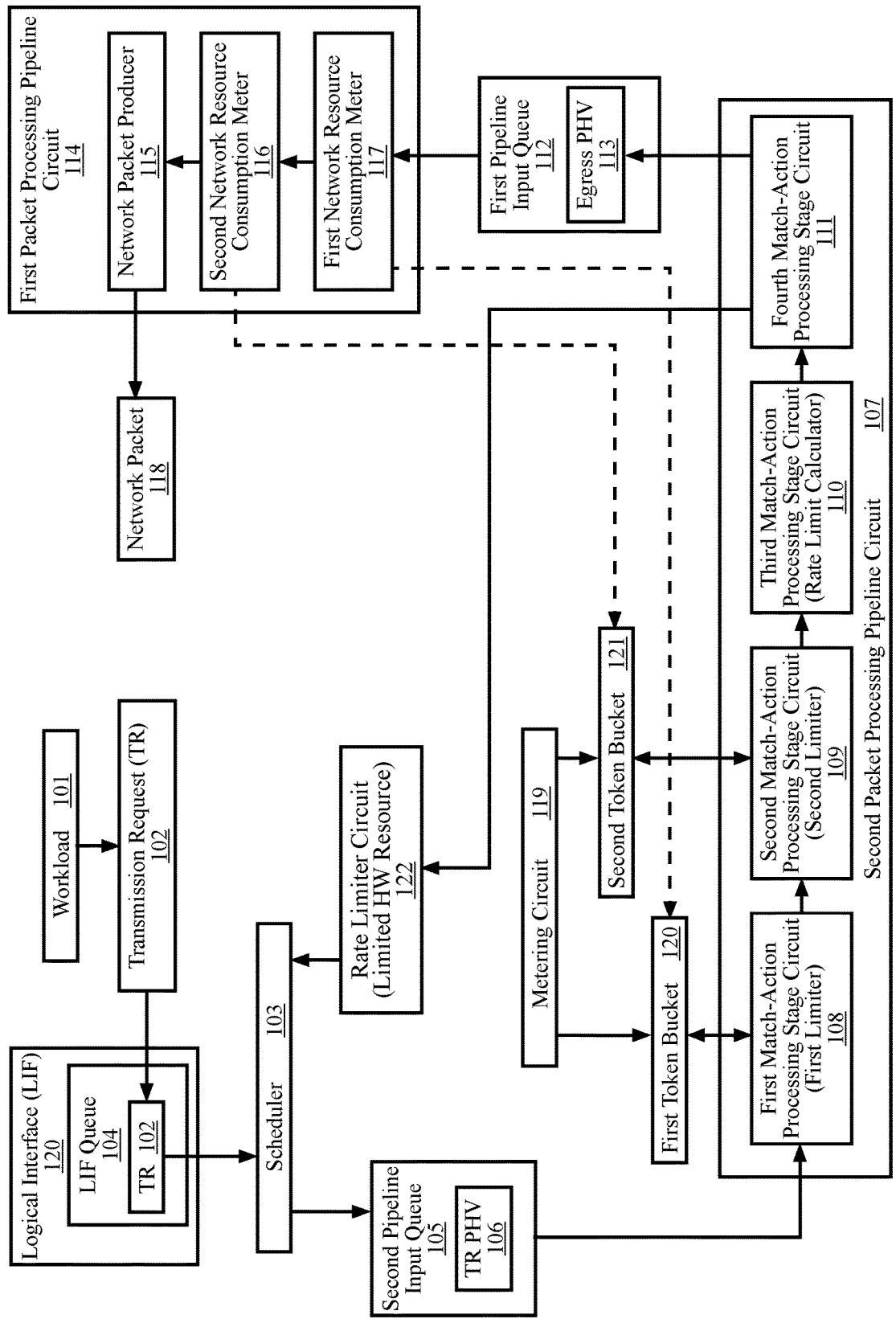
FIG. 1 is a high-level conceptual diagram illustrating a system for using a packet processing pipeline circuit to extend rate limiter circuit capabilities according to some aspects.

It will be readily understood that the components of the embodiments as generally described herein and illustrated in the appended figures could be arranged and designed in a wide variety of different configurations. Thus, the following more detailed description of various examples, as represented in the figures, is not intended to limit the scope of the present disclosure, but is merely representative of various embodiments. While the various aspects of the embodiments are presented in drawings, the drawings are not necessarily drawn to scale unless specifically indicated.

Systems and methods that implement aspects of the embodiments may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one embodiment. Thus, discussions of the features and advantages, and similar language, throughout this specification may, but do not necessarily, refer to the same embodiment.

Furthermore, the described features, advantages, characteristics, and aspects may be combined in any suitable manner in one or more systems or methods. One skilled in the relevant art will recognize, in light of the description herein, that an embodiment can be practiced without one or more of the specific features or advantages of another embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. A match-action pipeline has a series of match-action stages. Upon receiving a packet of a network traffic flow, the first match-action stage of a match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action stage can perform a default action. Match-action stages may pass the packet to a subsequent match-action stage in the match-action pipeline.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

Data centers run workloads for a variety of tenants and an aspect of hosting those workloads is meeting quality of service (QoS) guarantees. As such, communications for some workloads are throttled so that other tenants can receive their allotment of network services. The workloads are often run on hosts that have SmartNICs. A semiconductor chip designed for SmartNICs can include multiple packet processing pipeline circuits and other circuits that increase the chip's network packet processing capabilities. An aspect that can increase the chip's efficiency (e.g., throughput, throughput/Watt, etc.) is to avoid dropping packets. Egress pipelines often implement policing functions that intentionally drop packets of some workloads in order to ensure that other workloads receive the quality of service that a data center tenant is paying for. A workload can be rate limited in order to avoid dropping packets at the policer. With rate limiting, some packets aren't scheduled for workloads consuming more resources than they should. Policing drops packets. Rate limiting delays packets by not scheduling them. The semiconductor chip can include specialized rate limiter circuits. Using specialized rate limiting circuits is desirable because they can operate without slowing down other on-chip operations. The rate limiter circuits are a limited on-chip resource that may limit the number of workloads that may be hosted by a server.

The semiconductor chip can have other on-chip resources such as configurable packet processing pipeline circuits (e.g., P4 packet processing pipeline circuits) that can be configured to, in essence, virtualize some aspects of rate limiting such that fewer rate limiter circuits are consumed by each workload. Some of the processing stages of the pipeline can determine whether a workload has exceeded its quota for specific resources such as limiting bandwidth, limiting packet count, etc. Another processing stage can process the results of the previous stages to determine if and by how much a workload should be rate limited. Yet another processing stage can write into a rate limiting circuit to thereby throttle the resource consumption of the workload. In this manner, a single rate limiter circuit can be used for limiting bandwidth, while also limiting input/output operations per second (IOPS), while also rate limiting the consumption of other resources. This results in a number of advantages such as allowing for an increased number of workloads on a server, increasing the number of tenants on a server, and for more precisely rate limiting different aspects of workloads by separately rate limiting those aspects.

FIG. 1 is a high-level conceptual diagram illustrating a system for using a packet processing pipeline circuit 107 to extend rate limiter circuit 122 capabilities according to some aspects. There are two packet processing pipeline circuits shown. The first packet processing pipeline circuit 114 can perform the functions of an egress pipeline. An egress pipeline can perform egress processing such as workload policing and assembling network packets. The second packet processing pipeline circuit 107 can implement the virtualized rate limiters. A workload 101 can communicate with a remote system by sending a network packet 118 to that remote system. To do so, the workload can write a transmission request (TR) 102 to a logical interface (LIF) queue 104 in a LIF 120 provided by a communications interface such as a NIC. The communications interface can have many LIFs, each LIF can have many LIF queues, and there may be other queues that are queuing work to be performed by the communications interface. A scheduler 103 is responsible for scheduling the processing of TRs on all the LIF queues and may be responsible for scheduling the performance of other work. The scheduler 103 schedules the TR 102 for processing by taking the TR 102 from the LIF queue 104 and placing it on a second pipeline input queue 105 as a TR packet header vector (PHV) 106. The TR PHV 106 is scheduled for processing by the second packet processing pipeline circuit 107 when the TR PHV 106 is placed on the second pipeline input queue 105.

The TR PHV 106 can go from the second pipeline input queue 105 to the first match-action processing stage 108 of the second packet processing pipeline circuit 107. The TR PHV can then pass to the second match-action processing stage 109, then the third match-action processing stage 110, and then to the fourth match-action processing stage 111. Here, only four stages are shown whereas in practice there are often more. PHVs typically pass through all the stages, one after another. Hence the term "pipeline". The final match-action processing stage in the second packet processing pipeline can process the TR PHV 106 and place an egress PHV 113 on the first pipeline input queue 112. The egress PHV 113 is produced from the TR PHV 106 and may be substantially identical to the TR PHV 106. The first packet processing pipeline circuit 114 can take the egress PHV 113 from the first pipeline input queue 112 and process it to produce a network packet 118.

The first match-action processing stages of the second packet processing pipeline circuit 107 can implement aspects of limiters that use token buckets to determine if limiting is needed. The token buckets can be leaky token buckets. Leaky token buckets "leak" tokens as resources are used and can periodically receive tokens to replenish those that are "leaked". The tokens are added to the token buckets by a metering circuit 119. The metering circuit can be configured to add a specific number of tokens at a specific interval, such as 1000 tokens every 0.25 seconds. Each token bucket can receive a different number of tokens each interval. For example, based on QoS guarantees, one tenant's workloads could receive 10 times as many tokens as another tenant's workloads. Each limiter can add metadata to the TR PHV indicating if rate limiting is needed and how much limiting is needed. For example, if four limiters are implemented, then the TR PHV 106 can have metadata from all four limiters.

The first match-action processing stage 108 of the second packet processing pipeline circuit 107 can implement a first limiter, such as a bandwidth limiter. A bandwidth limiter can use the data in the TR PHV 106 to determine how many bytes will be transmitted. The bandwidth limiter can then subtract a number of tokens from the first token bucket 120 based on how many bytes will be transmitted (e.g., tokens subtracted=bytes/10,000). The bandwidth limiter can add metadata to the TR PHV 106 indicating whether and how much rate limiting is needed. The second match-action processing stage 109 can implement a second limiter such as an IOPS limiter. An IOPS limiter can use the data in the TR PHV 106 to determine how many network packets will be transmitted. The IOPS limiter can then subtract a number of tokens from the first token bucket 120 based on how many bytes will be transmitted (e.g., tokens subtracted=packets). The IOPS limiter can add metadata to the TR PHV 106 indicating whether and how much rate limiting is needed.

One of the processing stages, such as the third match-action processing stage 110, can implement a rate limit calculator. The rate limit calculator can use the data added to the TR-PHV by the limiters to determine whether and how much rate limiting to apply. For example, a first limiter may indicate the workload should be throttled for 10 metering circuit intervals, a second limiter may indicate the workload should be throttled for 3 metering circuit intervals, and a third limiter may indicate the workload does not need to be rate limited. The rate limit calculator may therefore determine that the workload should be throttled for 10 metering circuit intervals. The rate limit calculator can add metadata to the TR PHV 106 that indicates the amount of rate limiting to be applied to the workload.

Another one of the processing stages, such as the fourth match-action processing stage 111, can write into a rate limiter circuit 122 such that the rate limiter circuit 122 applies the desired amount of rate limiting to the workload. The rate limiter circuit can cause the scheduler 103 to stop placing work for the workload on the second pipeline input queue 105 until a specific number of metering intervals have elapsed.

In the discussion above, the rate limiters in the second packet processing pipeline circuit 107 subtract the tokens from the token buckets. Some implementations may instead use meters 116, 117 in the first packet processing pipeline circuit 114 to subtract the tokens. The first packet processing pipeline circuit 114 can include a first network resource consumption meter 117, a second network resource consumption meter 116, and a network packet producer 115. The network packet producer 115 produces the network packet 118 from the egress PHV 113, assuming the policers in the first packet processing pipeline circuit 114 don't cause the packet to be dropped. The meters in the first packet processing pipeline 114 can determine the amount of resource actually consumed when they are consumed. The meters 116, 117 can then subtract the proper number of tokens from the token buckets.

Figure 2:
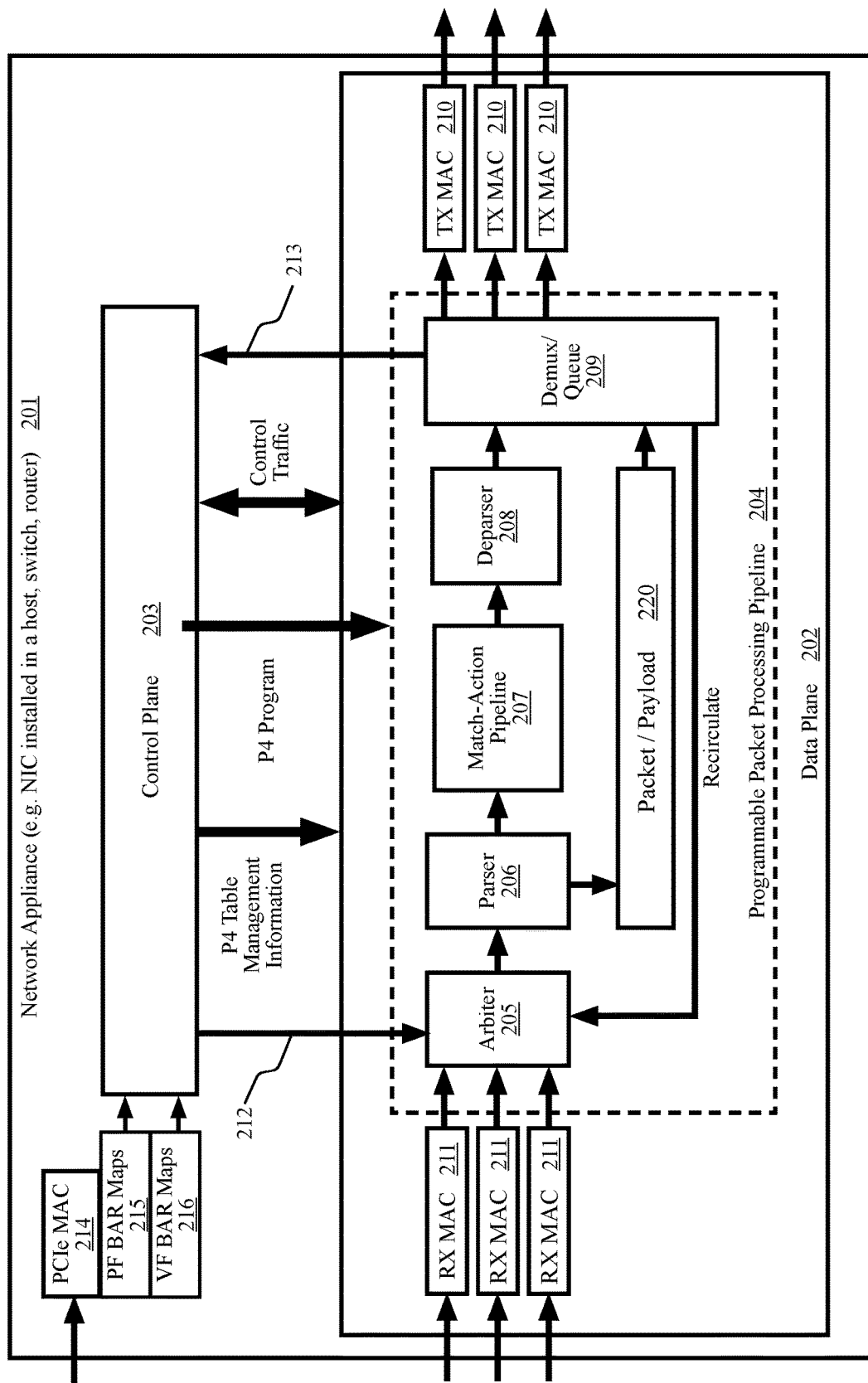
FIG. 2 is a functional block diagram of a network appliance having a control plane and a data plane and in which aspects may be implemented.

FIG. 2 is a functional block diagram of a network appliance having a control plane and a data plane and in which aspects may be implemented. A network appliance 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The document "P4$_{16}$ Language Specification," version 1.2.2, published by the P4 Language Consortium on May 17, 2021, which is incorporated by reference herein, describes the P4 domain-specific language that can be used for programming the data plane of network appliances. P4 (also referred to herein as the "P4 specification," the "P4 language," and the "P4 program") is designed to be implementable on a large variety of targets including switches, routers, programmable NICs, software switches, semiconductor chip, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output central processing unit (CPU) port 213. The control plane is often referred to as a CPU although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A network appliance 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
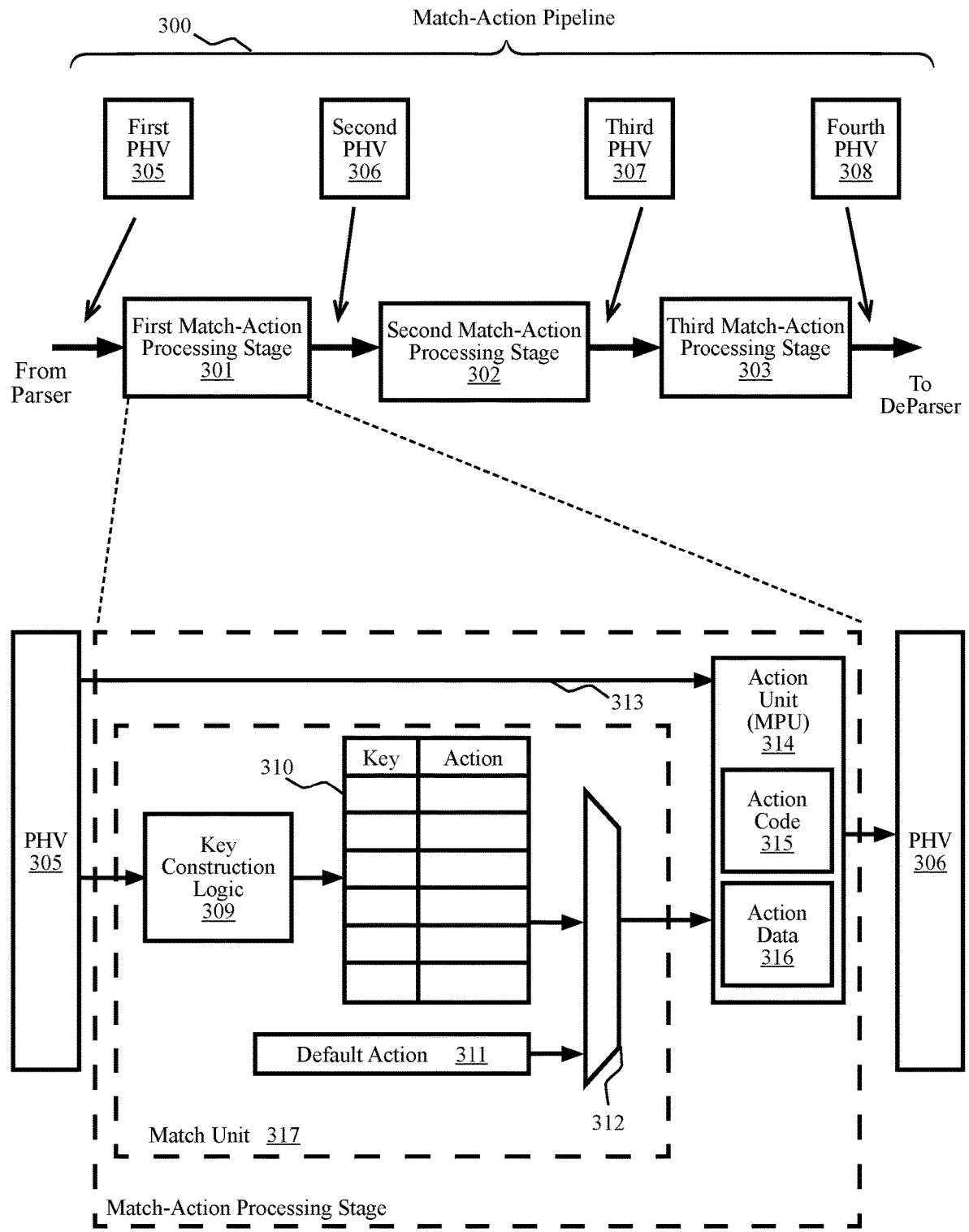
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often called stages or match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action processing stages in the match-action pipeline in series and each match-action processing stages can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308. The match-action processing stages are arranged as a match-action pipeline because the PHVs pass from one match-action processing stage to the next match-action processing stage in the pipeline.

An expanded view of elements of a match-action processing stage 301 of match-action pipeline 300 is shown. The match-action processing stage includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action processing stages can be programmable by the control plane via P4 and the contents of the lookup table can be managed by the control plane.

Figure 4:
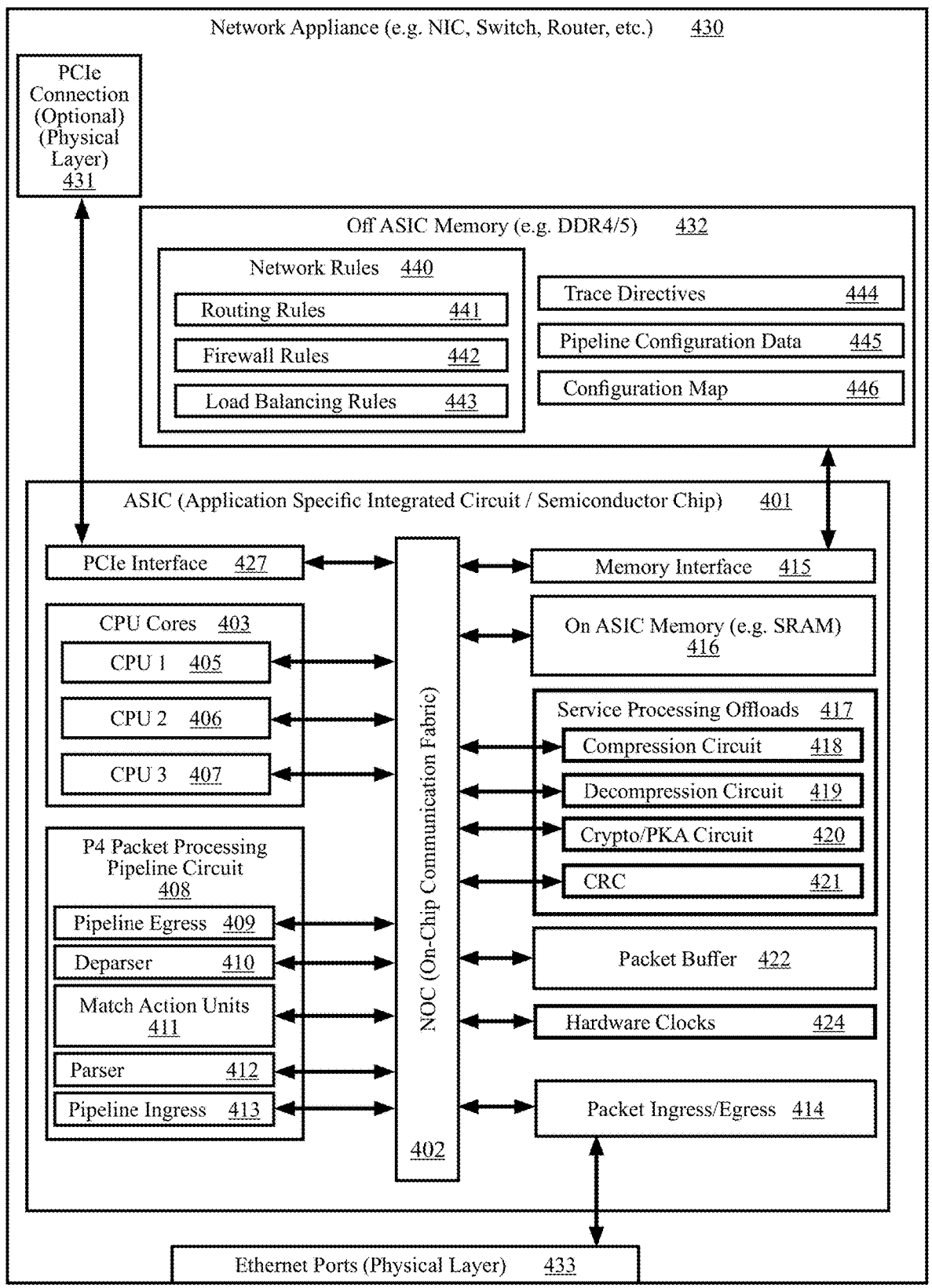
FIG. 4 is a functional block diagram of a network appliance having a semiconductor chip such as an application specific integrated circuit (ASIC) or field programmable gate array (FPGA), according to some aspects.

FIG. 4 is a functional block diagram of a network appliance 430 having a semiconductor chip 401 such as an ASIC or FPGA, according to some aspects. The semiconductor chip 401 shows a single semiconductor chip implementing a large number of hardware functions. A different and substantially equivalent implementation may employ a chiplet architecture. If the network appliance is a network interface card (NIC) then the NIC can be installed in a host computer and can act as a network appliance for the host computer and for virtual machines running on the host computer. Such a NIC can have a PCIe connection 431 for communicating with the host computer via a host PCIe connection. The network appliance 430 can have a semiconductor chip 401, off chip memory 432, and ethernet ports 433. The off-chip memory 432 can be one of the widely available memory modules or chips such as double data rate 5 (DDR5) synchronous dynamic random-access memory (SDRAM) such that the semiconductor chip 401 has access to many gigabytes of memory on the network appliance 430. The ethernet ports 433 provide physical connectivity to a computer network such as the internet. The NIC can include a printed circuit board to which the semiconductor chip 401 and the memory 432 are attached.

The semiconductor chip can have many core circuits interconnected by an on-chip communications fabric, sometimes called a network on a chip (NOC) 402. NOCs are often implementations of standardized communications fabrics such as the widely used advanced extensible interface (AXI) bus. The semiconductor chip's core circuits can include a PCIe interface 427, CPU 403, first packet processing pipeline circuit 408, memory interface circuit 415, on chip memory such as static random access memory (SRAM) 416, service processing offloads 417, a packet buffer 422, metering circuit 423, and packet ingress/egress circuits 414. The PCIe interface 427 can be used to communicate with a host computer via the PCIe connection 431. The CPU 403 can include numerous CPU cores such as a first CPU core 405, a second CPU core 406, and a third CPU core 407. The first packet processing pipeline circuit 408 can include a pipeline ingress circuit 413, a parser circuit 412, match-action pipeline 411, a deparser circuit 410, and a pipeline egress circuit 409. The second packet processing pipeline circuit 425 can include a PHV ingress circuit 428, a match-action pipeline 434, and a direct memory access (DMA) output circuit 426. The service processing offloads 417 are circuits implementing functions that the semiconductor chip uses so often that the designer has chosen to provide hardware for offloading those functions from the CPU. The service processing offloads can include a compression circuit 418, decompression circuit 419, an encryption/decryption circuit 420, and a general use CRC calculation circuit 421. The general use CRC calculation circuit 421 can calculate digest values for data blocks. For example, the general use CRC calculation circuit 421 can calculate Ethernet FCS values. The specific core circuits implemented within the non-limiting example of the semiconductor chip 401 can be selected such that the semiconductor chip implements many, perhaps all, of the functionality of an InfiniBand channel adapter, of an NVMe card, and of a network appliance that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The first packet processing pipeline circuit 408 is a specialized set of elements for processing PHVs including PHVs for network packets such as internet protocol (IP) packets and InfiniBand protocol data units (PDUs). The first packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The second packet processing pipeline circuit 425 is a specialized set of elements for processing PHVs including PHVs for network packets such as internet protocol (IP) packets and InfiniBand protocol data units (PDUs). The second packet processing pipeline circuit 425 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services, upgrading the control plane, and upgrading the data plane. The network appliance can use the memory 432 to store token buckets 440 such as a first token bucket, a second token bucket 442, and a last token bucket 443. The memory 432 can also store logical interfaces (LIFs) 444 such as a first LIF 445, a second LIF 446, and a last LIF 447. In many implementations, the token buckets are stored in the on-chip memory 416 of the semiconductor chip 401 such that the token buckets can be more rapidly accessed by the packet processing pipeline circuits 408, 425 and the metering circuit 119.

The CPU cores 405, 406, 407 can be general purpose processor cores, such as ARM processor cores, microprocessor without interlocked pipelined stages (MIPS) processor cores, and/or x86 processor cores, as is known in the field. Each CPU core can include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by a packet processing pipeline circuits 408, 425.

The first packet processing pipeline circuit 408 can be a specialized circuit or part of a specialized circuit using one or more semiconductor chips such as ASICs or FPGAs to implement programmable packet processing pipelines such as the programmable packet processing pipeline 204 of FIG. 2. Some embodiments include semiconductor chips such as ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU 403 and memory 432 are configured via software to implement a slow data path. A network appliance having two data paths has a fast data path and a slow data path when one of the data paths processes packets faster than the other data path.

All data transactions in the semiconductor chip 401, including on-chip memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the first packet processing pipeline circuit 408, the second packet processing pipeline circuit 425, CPU 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
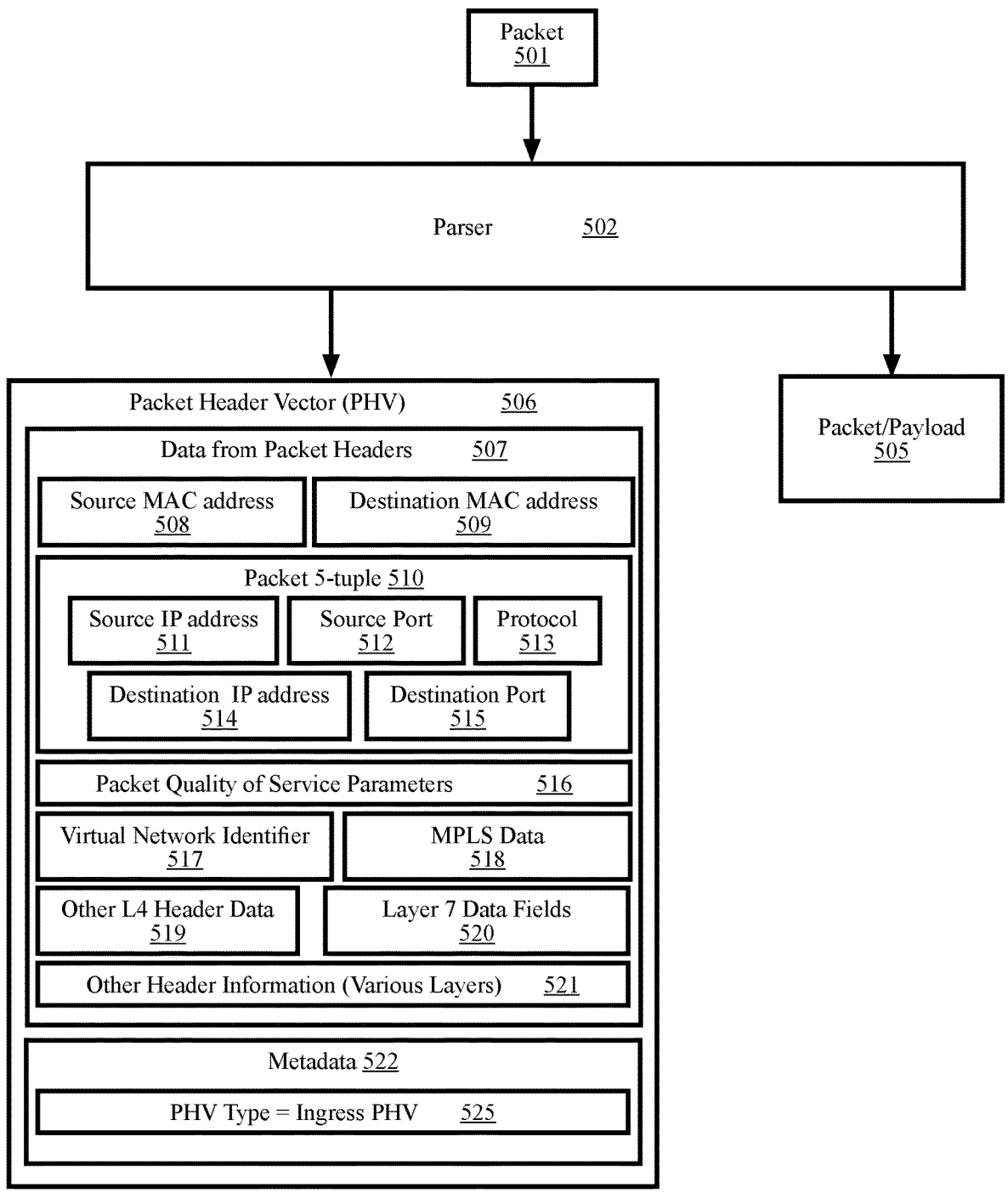
FIG. 5 is a high-level diagram illustrating an example of generating a packet header vector from a packet according to some aspects.

FIG. 5 is a high-level diagram illustrating an example of generating an ingress packet header vector 506 from a packet 501 according to some aspects. The PHV 506 is an ingress PHV because it is produced by a parser 502 parsing a packet 501 received via an ingress port as a bit stream. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the network appliance such as the hardware port on which the packet 501 was received and the packet timestamps indicating when the packet 501 was received by the network appliance, enqueued, dequeued, etc. The metadata 522 can also include data produced by the network appliance while processing a packet or assembling a packet. Such metadata 522 can include a PHV type 525 (e.g., Ingress PHV).

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet 5-tuple 510 is often used for generating keys for match tables. The packet 5-tuple 510 can include the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
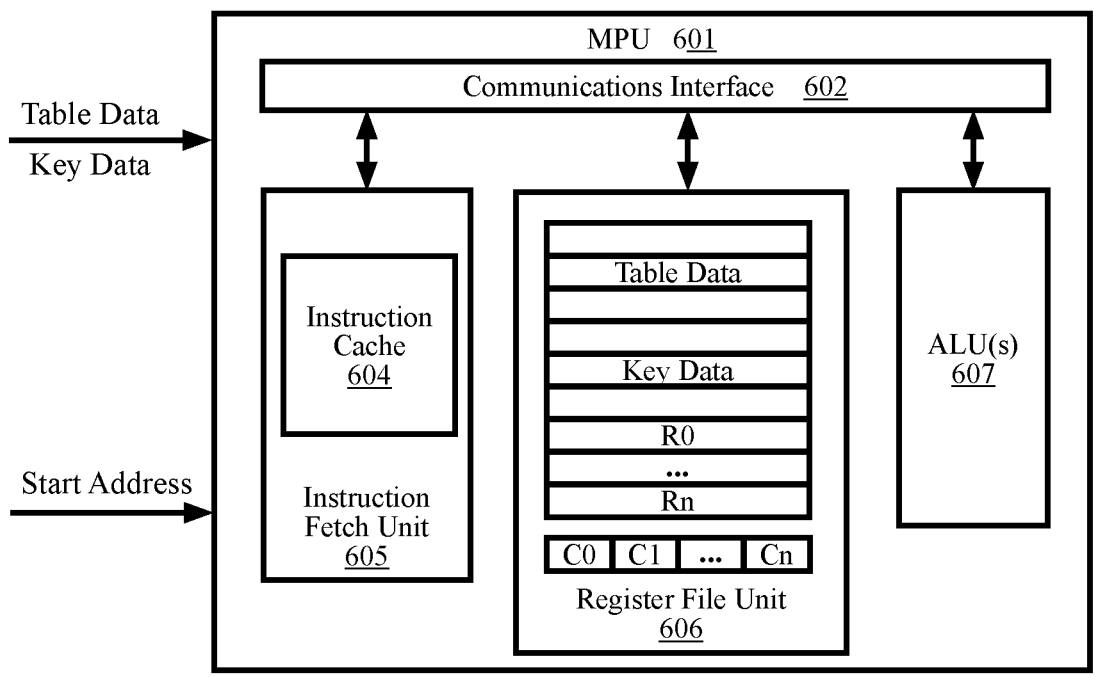
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
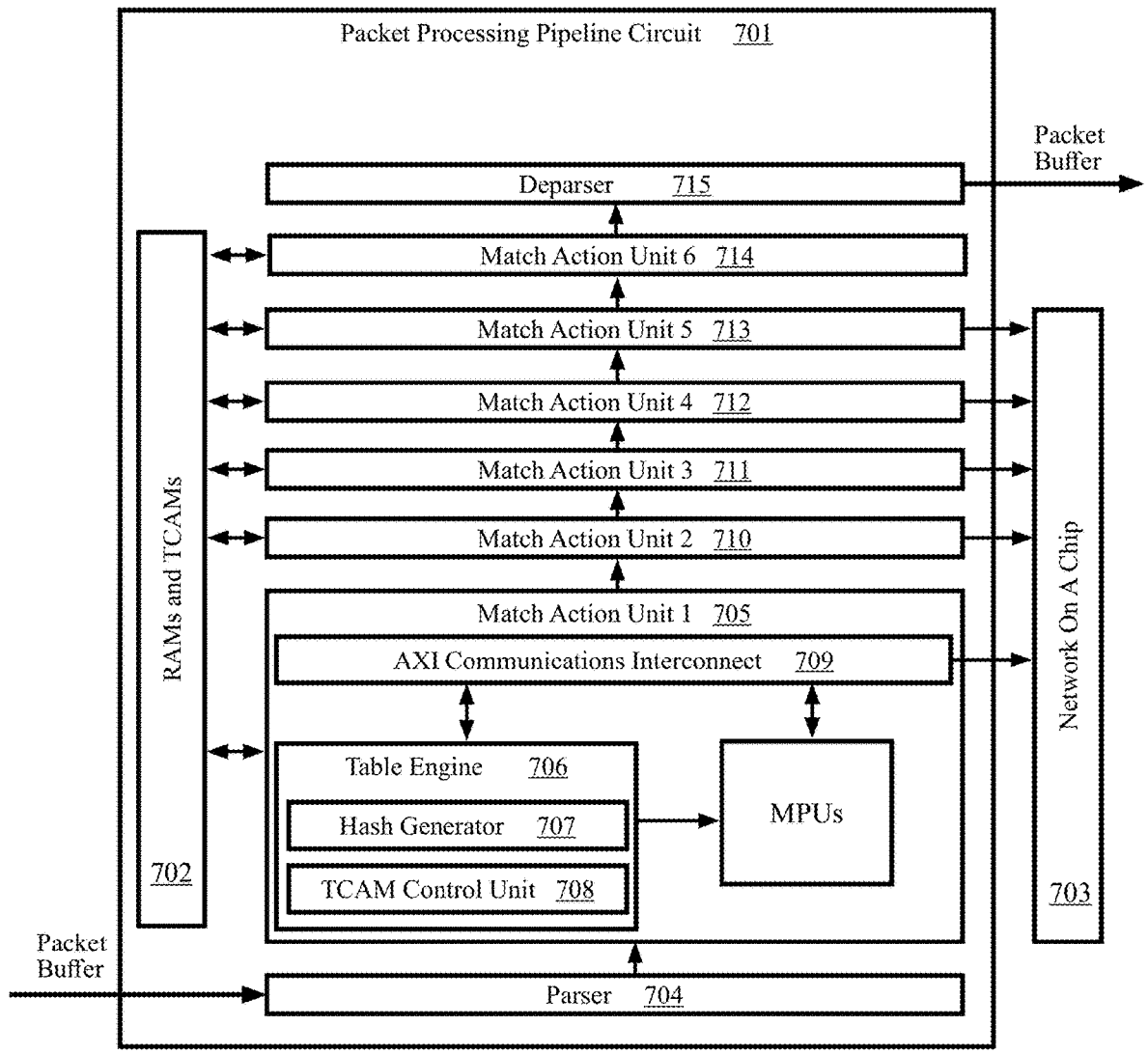
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline circuit in a semiconductor chip. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 can have a P4 pipeline that is implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action processing stages 705, 710, 711, 712, 713, 714 can be the same as the MPU 601 of FIG. 6. Match-action processing stages can have any number of MPUs. The match-action processing stage of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action processing stages such as the six units illustrated in the example of FIG. 7. In practice, a match-action pipeline can have any number of match-action processing stages. The match-action processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

The second match-action pipeline circuit 425 includes a match-action pipeline 434. That match action pipeline 434 can include match-action processing stages such as match-action processing stages 705, 710, 711, 712, 713, 714.

Figure 8:
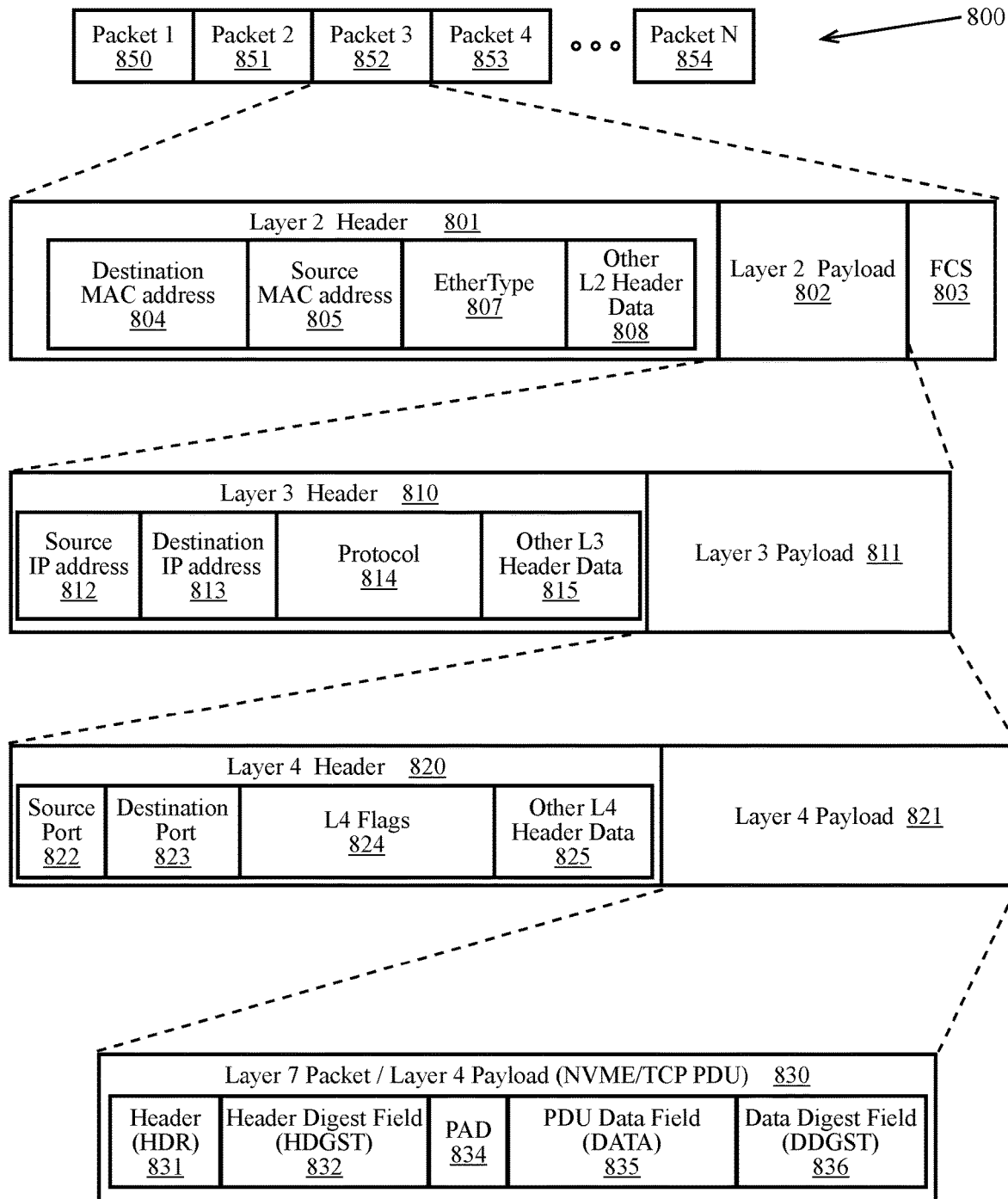
FIG. 8 illustrates packet headers and payloads of packets for network traffic flows including a NVMe/TCP PDU in a layer 4 payload according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a network appliance 201 can have MAC addresses. A network appliance 201 can have a MAC address that is applied to all or some of the ports. Alternatively, a network appliance may have one or more ports that each have their own MAC address. In general, each port can send and receive packets. As such, a port of a network appliance can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header of an IP packet is an IP header and the layer 3 payload of an IP packet is an IP payload. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) can have a layer 4 header 820 (a TCP header is shown) and a layer 4 payload 821 (a TCP payload is shown). The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. The illustrated layer 7 packet is a NVMe/TCP PDU 830. NVM Express, Inc. is a trade organization that provides standards for NVMe communications. Version 1.0 of the NVM Express TCP Transport Specification was published on May 18, 2021 and discloses the contents and structure of NVMe PDUs. An NVMe/TCP PDU can include a header 831, a header digest field 832, a pad 834, a PDU data field 835, and a data digest field 836. The PDU data field 835 can hold the first encrypted block 438. When the PDU data field 835 holds the first encrypted block 438, the data digest field 836 should hold the digest value for the first encrypted block 438. The PDU data field 835 can hold numerous encrypted blocks. When the PDU data field 835 holds numerous encrypted blocks, the data digest field 836 should hold the digest value for the entire PDU data field 835. Such a digest value may be determined from the individual digest values of the numerous encrypted blocks in the PDU data field.

Figure 9:
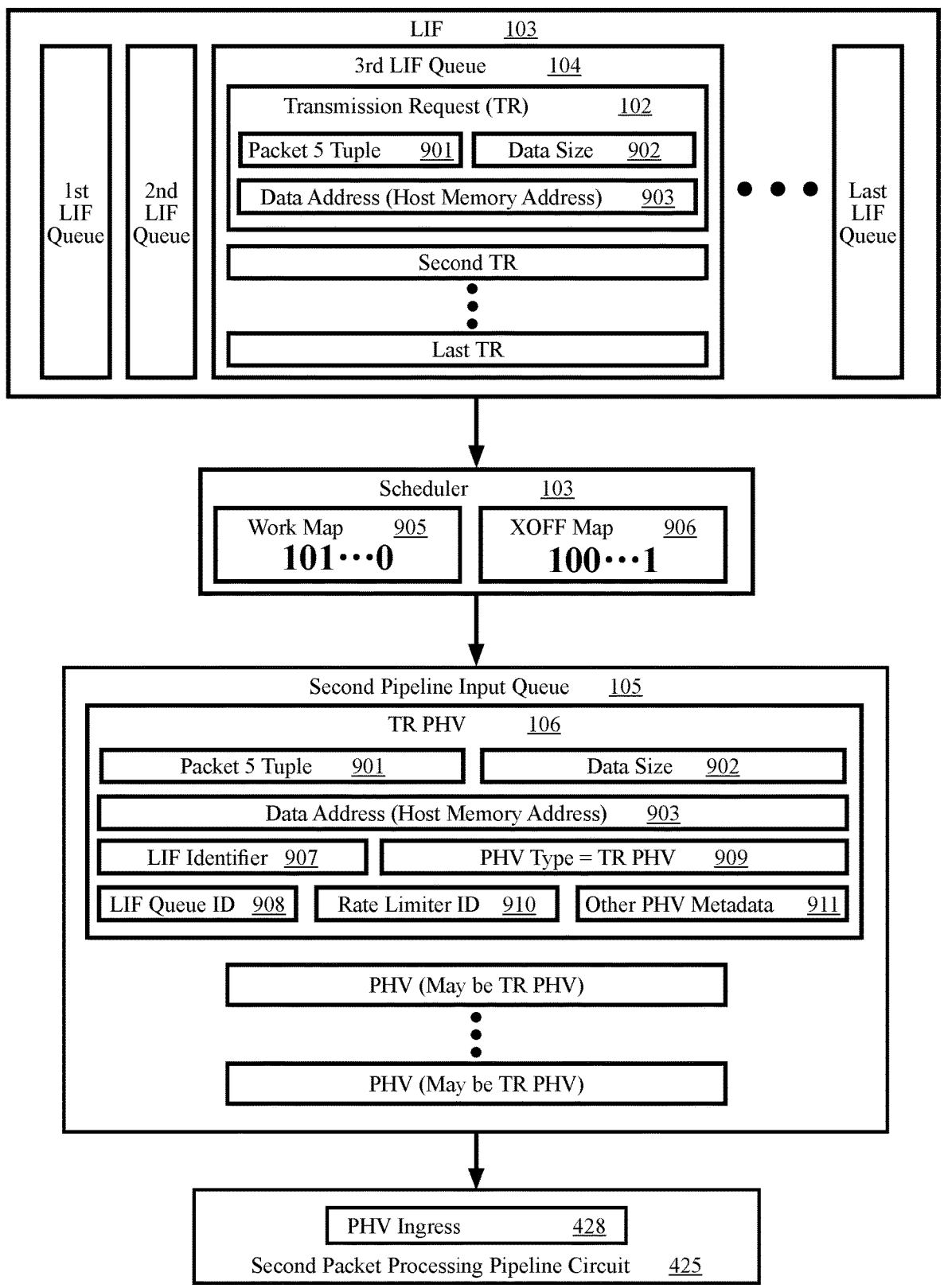
FIG. 9 is a high-level conceptual diagram illustrating a scheduler using a work map and a XOFF map according to some aspects.

FIG. 9 is a high-level conceptual diagram illustrating a scheduler using a work map and a XOFF map according to some aspects. A LIF can have multiple LIF queues such as a first LIF queue, a second LIF queue, a third LIF queue 104, etc. A workload can place transaction requests on a LIF queue. A transaction request (TR) can include a packet 5-tuple 901, a data size 902, and a data address 903. The packet 5-tuple 901 can include a source IP address, a source port indicator, a destination IP address, a destination port indicator, and a protocol indicator. The data address 903 can be an address in memory where the data to be transmitted is stored. The data size can indicate the size in memory of the data to be transmitted.

A scheduler 103 can take TRs from the LIF queues, transform them into TR PHVs, and put the TR PHVs on the second pipeline input queue 105. The scheduler has a work map 905 that indicates LIF queues that have queued TRs. A bit in the work map 905 can be set when a workload adds a TR to a LIF queue. This may be accomplished by writing into a doorbell register that alerts the system that a TR has been placed on a LIF queue. The system then sets the bit in the work map 905 and clears the doorbell. The scheduler can use a round robin algorithm or some other scheduling algorithm to select which LIF queue to service by dequeuing a TR 102 and placing a TR PHV 106 on the second pipeline input queue 105. If the scheduler empties a LIF queue, then it can clear the corresponding bit in the work map 905 to thereby indicate that the emptied LIF queue is empty. The work map 905 is illustrated as a bit map containing "101 . . . 0". The work map 905 is indicating that the first LIF queue and the third LIF queue 104 have TRs while the second LIF queue and the last LIF queue are empty.

The scheduler 103 also has an XOFF map 906. The XOFF map 906 indicates which of the LIF queues are being throttled. The scheduler does not take TRs from LIF queues that are being throttled. The effect of throttling a LIF queue is to backpressure a workload. The workload can continue adding TRs to a LIF queue until the LIF queue is full. At that point, the workload is back pressured and may be paused until the LIF queue is serviced by the scheduler, thereby opening a spot in the LIF queue. A rate limiter circuit can set a bit in the XOFF map and can clear a bit in the XOFF map to thereby govern the network resource consumption rate of a workload. The XOFF map 906 is illustrated as a bit map containing "100 . . . 1". The XOFF map 906 is indicating that the scheduler should not service the first LIF queue and the last LIF queue but should continue to service the second LIF queue and the third LIF queue 104.

The scheduler 103 can service the third LIF queue 104 by taking a TR 102 off the third LIF queue 104, transforming the TR 102 into a TR PHV 106, and placing the TR PHV on the second pipeline input queue 105. The TR PHV 106 can include the packet 5-tuple 901, the data size 902, the data address 903, a LIF identifier 907, a PHV type value 909, a LIF queue identifier 908, a rate limiter identifier 910, and other PHV metadata. The LIF identifier 907 and the LIF queue identifier 908 can be used to identify which LIF queue is to be throttled by setting a bit in the XOFF map. More specifically, the LIF identifier 907 and the LIF queue identifier 908 may be used to determine which bits in the XOFF map should be set to backpressure a workload. The rate limiter identifier 910 can specify which one of the rate limiter circuits is configured to backpressure the workload. The PHV type value 909 is illustrated as indicating that the TR PHV 106 is a TR PHV. The PHV ingress circuit 428 of the second packet processing pipeline circuit 425 takes PHVs off of the second pipeline input queue 105 for processing by the second packet processing pipeline circuit 425.

Figure 10:
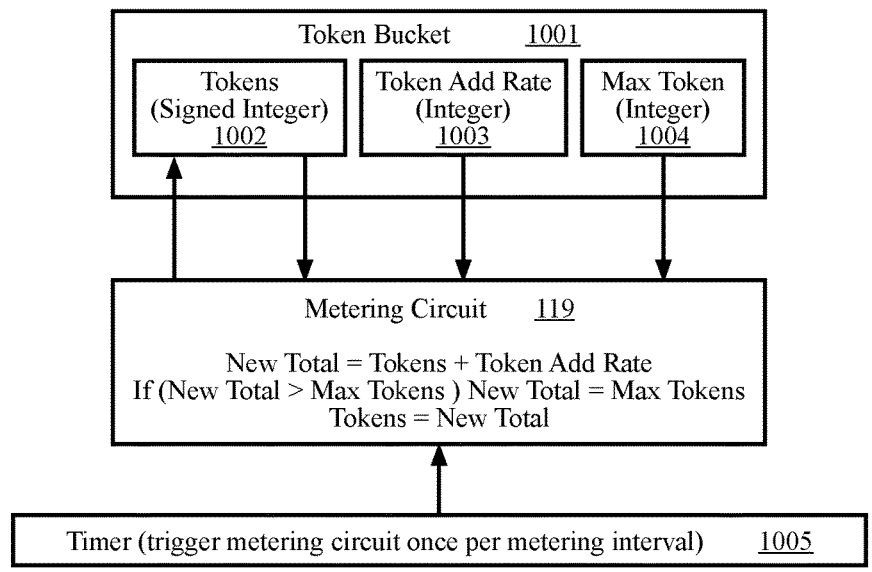
FIG. 10 is a high-level conceptual diagram illustrating a metering circuit refilling the tokens in a leaky token bucket according to some aspects.

FIG. 10 is a high-level conceptual diagram illustrating a metering circuit 119 refilling the tokens in a leaky token bucket 1001 according to some aspects. The token bucket 1001 can include a tokens value 1002, a token add rate value, and a maximum tokens value 1004. The tokens value 1002 indicates how many tokens are in the bucket. The token add rate 1003 indicates the number of tokens to be added to the tokens value 1002 every metering interval. The max tokens value 1004 indicates the maximum number of tokens that can be in the token bucket. The tokens value can be a signed integer. A negative number of tokens indicates that a LIF queue should be rate limited by setting a bit in the XOFF map 906. Max tokens 1004 and the token add rate 1003 can be set based on the QoS that is to be provided to the workload or tenant running the workload. An interval timer 1005 can trigger the metering circuit 119 every metering interval (e.g., every 0.1 seconds). Every time it is triggered, the metering circuit 119 can add the number of tokens indicated by the token add rate 1003 to the tokens value up to the maximum indicated by the maximum token value 1004. The tokens can be removed from the token bucket by the second packet processing pipeline circuit 107. A number of tokens are removed from the token bucket by subtracting that number from the tokens value. For example, 10 tokens are removed by subtracting 10 from the tokens value. The second packet processing pipeline circuit can remove tokens from the token buckets based on the consumption of the network resources by the workloads.

Figure 11:
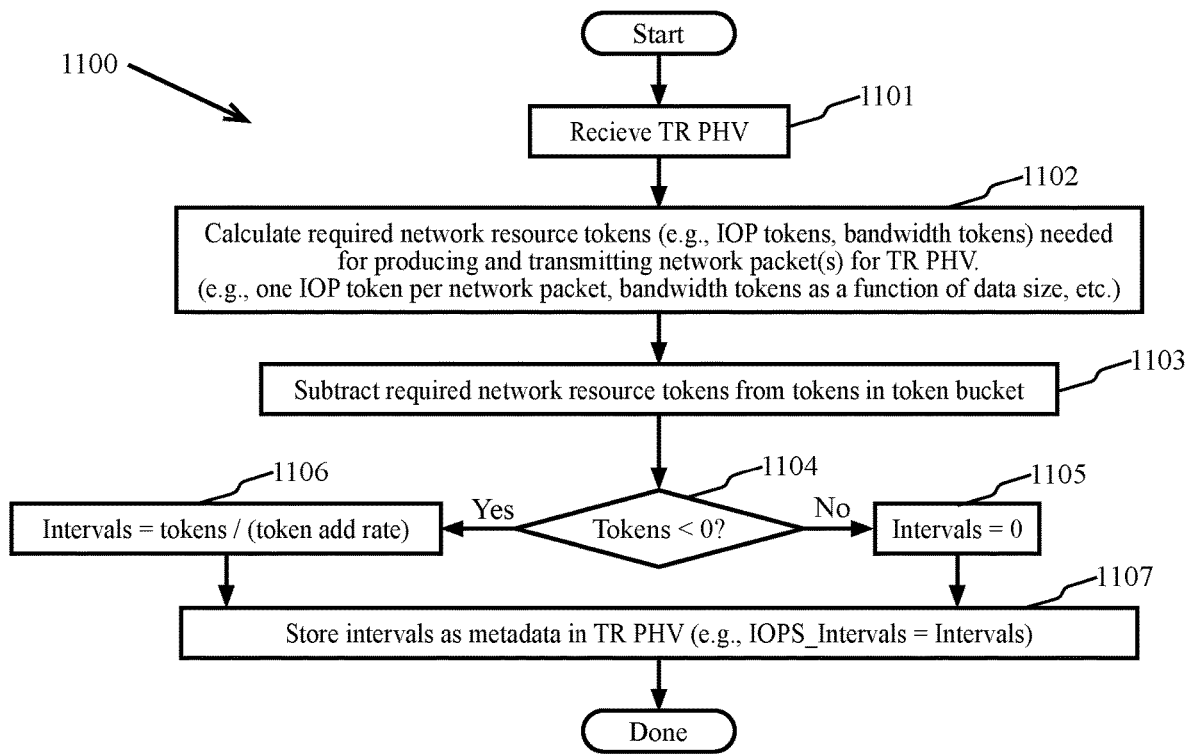
FIG. 11 is a high-level flow diagram illustrating a process that determines the number of intervals until clearing an XOFF bit according to some aspects.

FIG. 11 is a high-level flow diagram illustrating a process that determines the number of intervals until clearing an XOFF bit 1100 according to some aspects. A match-action stage in a match-action pipeline that is configured as a limiter can implement the process. After the start, at block 1101 the process can receive a PHV. At block 1102, the process can calculate the required network resource tokens (e.g., IOP tokens, bandwidth tokens) needed for producing and transmitting a network packet(s) for TR PHV (e.g., one IOP token per network packet, bandwidth tokens as a function of data size, etc.). At block 1103, the process can subtract the required number of tokens from the tokens value 1002 in a token bucket. At decision block 1104, the process can determine whether the tokens value 1002 is less than zero. If the tokens value 1002 is less than zero, then the process moves to block 1106. At block 1106, the process can set an intervals value to the number of metering intervals required for the metering circuit to increase the tokens value 1002 to a value that is greater than zero. At block 1107, the intervals value can be stored in the TR PHV as metadata. If, at decision block 1104, the tokens value 1002 is not less than zero then the process moves to block 1105. At block 1105, the intervals value can be set to zero before the process moves to block 1107.

Figure 12:
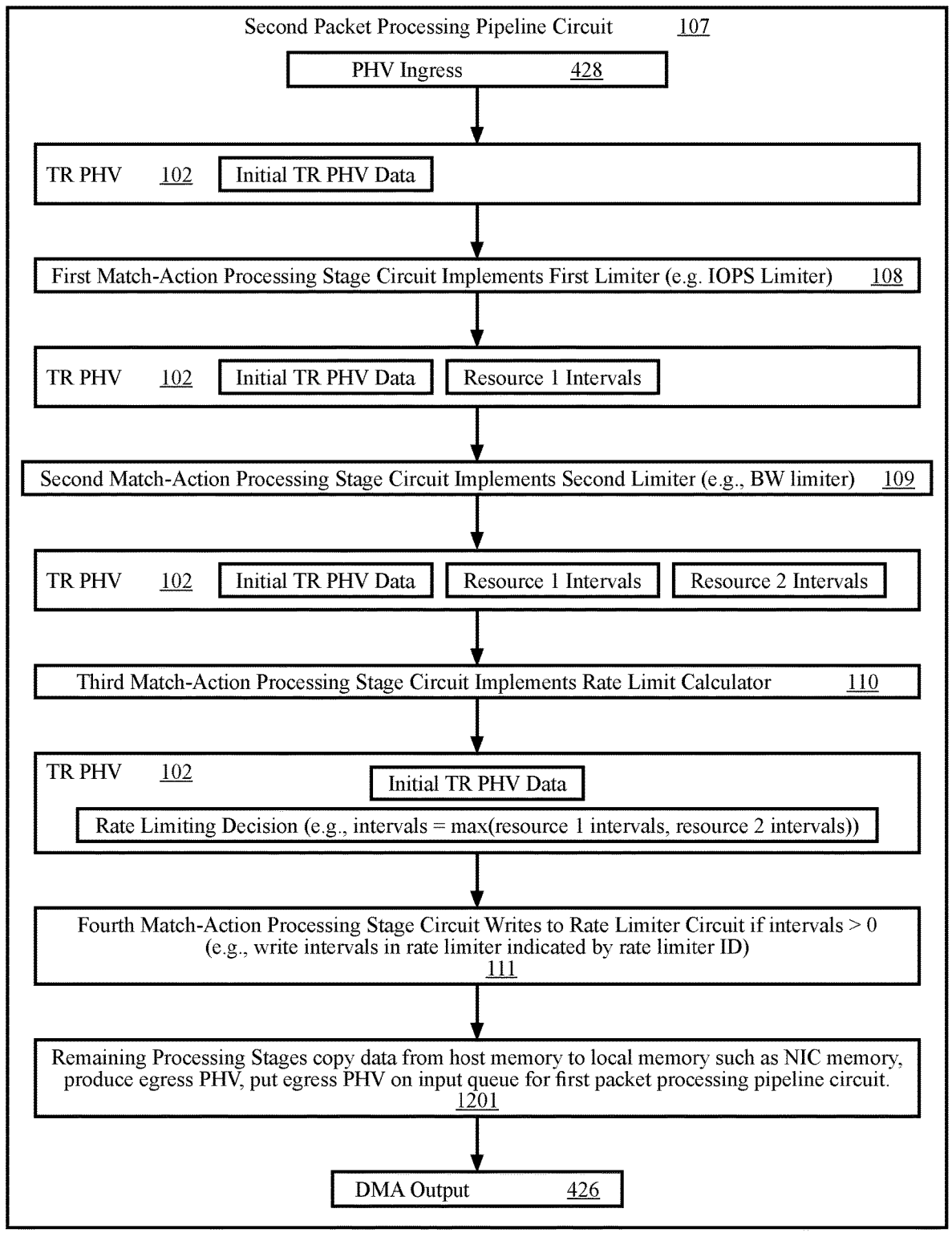
FIG. 12 is a high-level conceptual diagram illustrating a packet processing pipeline circuit with match-action stages configured as rate limiters according to some aspects.

FIG. 12 is a high-level conceptual diagram illustrating a packet processing pipeline circuit 107 with match-action stages 108, 109 configured as rate limiters according to some aspects. The PHV ingress circuit 428 can receive a TR PHV 106 from the second pipeline input queue 105 and pass the TR PHV 106 to the first match-action processing stage 108 in the match-action pipeline. The first match-action processing stage 108 can implement a first limiter, such as an IOPS limiter, using a process similar to the process illustrated in FIG. 11. The first match-action processing stage 108 can add a resource 1 intervals value to the TR PHV as indicated by block 1107 if FIG. 11. The second match-action processing stage 109 receives the TR PHV 106 from the first match-action stage. The second match-action processing stage 109 can implement a second limiter, such as a bandwidth limiter, using a process similar to the process illustrated in FIG. 11. The second match-action processing stage 109 can add a resource 2 intervals value to the TR PHV as indicated by block 1107 if FIG. 11. The third match-action processing stage 110 receives the TR PHV 106 from the second match-action stage. The third match-action processing stage 110 can be configured as a rate limit calculator that makes a rate limiting decision. The rate limit calculator can set an intervals value to the largest of the resource intervals values from the preceding stages. For example, the intervals value can be set as:

intervals=max (resource 1 intervals, resource 2 intervals).

The intervals value is the rate limiting decision. If the intervals value is zero, no rate limiting is needed. If the intervals value is greater than zero, rate limiting is needed. The fourth match-action processing stage 111 receives the TR PHV 106 from the third match-action processing stage 110. The fourth match-action stage can cause a rate limiter circuit to throttle the LIF queue and in some cases the entire LIF that is indicated in the TR PHV by the LIF identifier 907 and the LIF queue identifier 908. When the fourth match-action stage 111 writes rate limiting data from the rate limiting decision in the rate limiter circuit it can thereby cause the rate limiter circuit to set XOFF bits in the schedulers XOFF map. Setting the bits in the XOFF map causes the scheduler to limit scheduling of TR PHVs based on the transmission requests from a workload. The remaining processing stages 1201 of the second packet processing pipeline can perform operations that are needed in order for the first packet processing pipeline to assemble the network packet. For example, the remaining stages can copy the data from host memory to local memory such as NIC memory, 432 produce an egress PHV from the TR PHV, put the egress PHV on input queue for the first packet processing pipeline circuit, etc.

Figure 13:
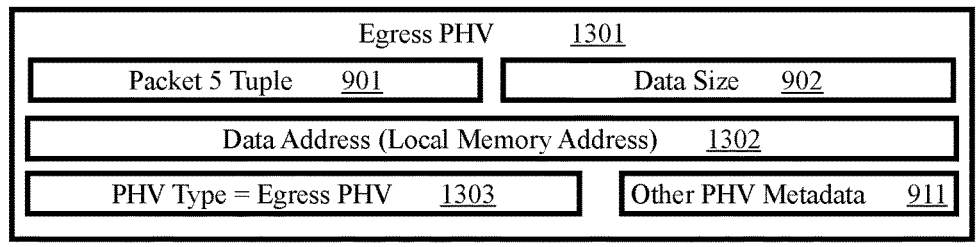
FIG. 13 is a high-level conceptual diagram of an egress PHV according to some aspects.

FIG. 13 is a high-level conceptual diagram of an egress PHV according to some aspects. The egress PHV 1301 can include the packet 5-tuple 901, the data size 902, the data address 1302, a PHV type 1303, and other PHV metadata 911. The data address 1302 can indicate the address in a local memory 432 of the data to be included in the network packet after the second packet processing pipeline circuit 107 has transferred the data from the host memory to the memory 432 of the NIC. The PHV type 1303 can indicate that the PHV is an egress PHV.

Figure 14:
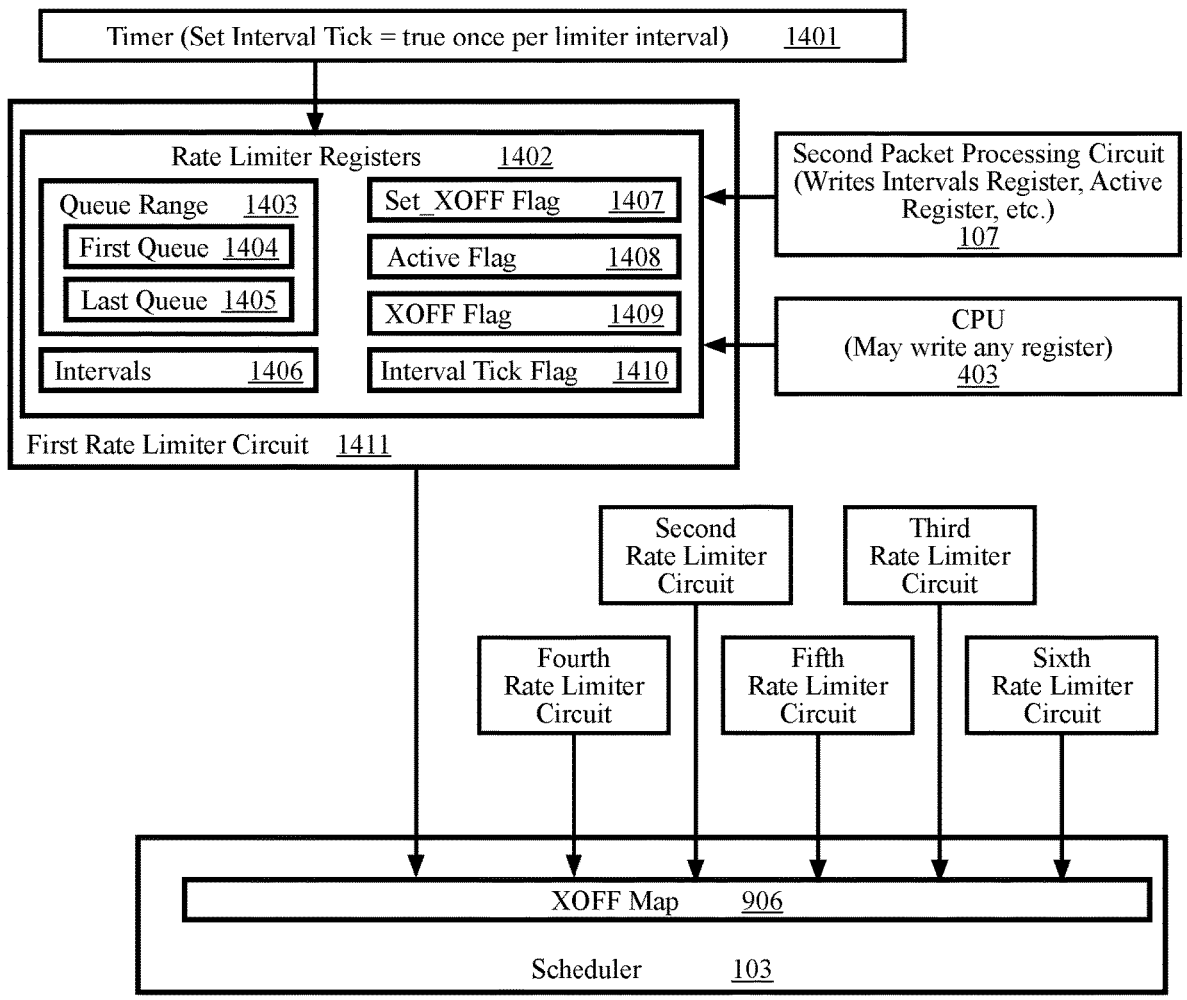
FIG. 14 is a high-level conceptual diagram of aspects of a rate limiter circuit according to some aspects.

FIG. 14 is a high-level conceptual diagram of aspects of a rate limiter circuit 1411 according to some aspects. The rate limiter circuit can include registers such as queue range registers 1403, an intervals register 1406, a Set_XOFF flag 1407, and active flag 1408, and XOFF flag 1409, and an interval tick flag 1410. A timer 1401 can periodically set the interval tick flag 1410. For example, if the interval is 0.1 seconds, then the timer can set the interval tick flag every 0.1 seconds. A workload may require many LIF queues. As such, a LIF for the workload can be assigned a range of LIF queues. The range of LIF queues can be indicated by queue range registers 1403 that include a first queue indicator 1404 and a last queue indicator 1405. The queue range registers 1403 can indicate a range of XOFF bits that are to be set and cleared to thereby rate limit the workload. The second packet processing pipeline circuit 107 can set the intervals register to the intervals value calculated by the rate limit calculator. The Set_XOFF flag 1407 can indicate that the rate limiter circuit is to set the XOFF bits indicated by the queue range registers 1403. The XOFF flag 1409 can indicate the current state of the XOFF bits indicated by the queue range registers 1403. The active flag 1408 can indicate whether or not the rate limiter circuit is active. The rate limiter circuit 1411 controls one LIF queue when the first queue indicator 1404 and the second queue indicator 1405 are equal.

Figure 15:
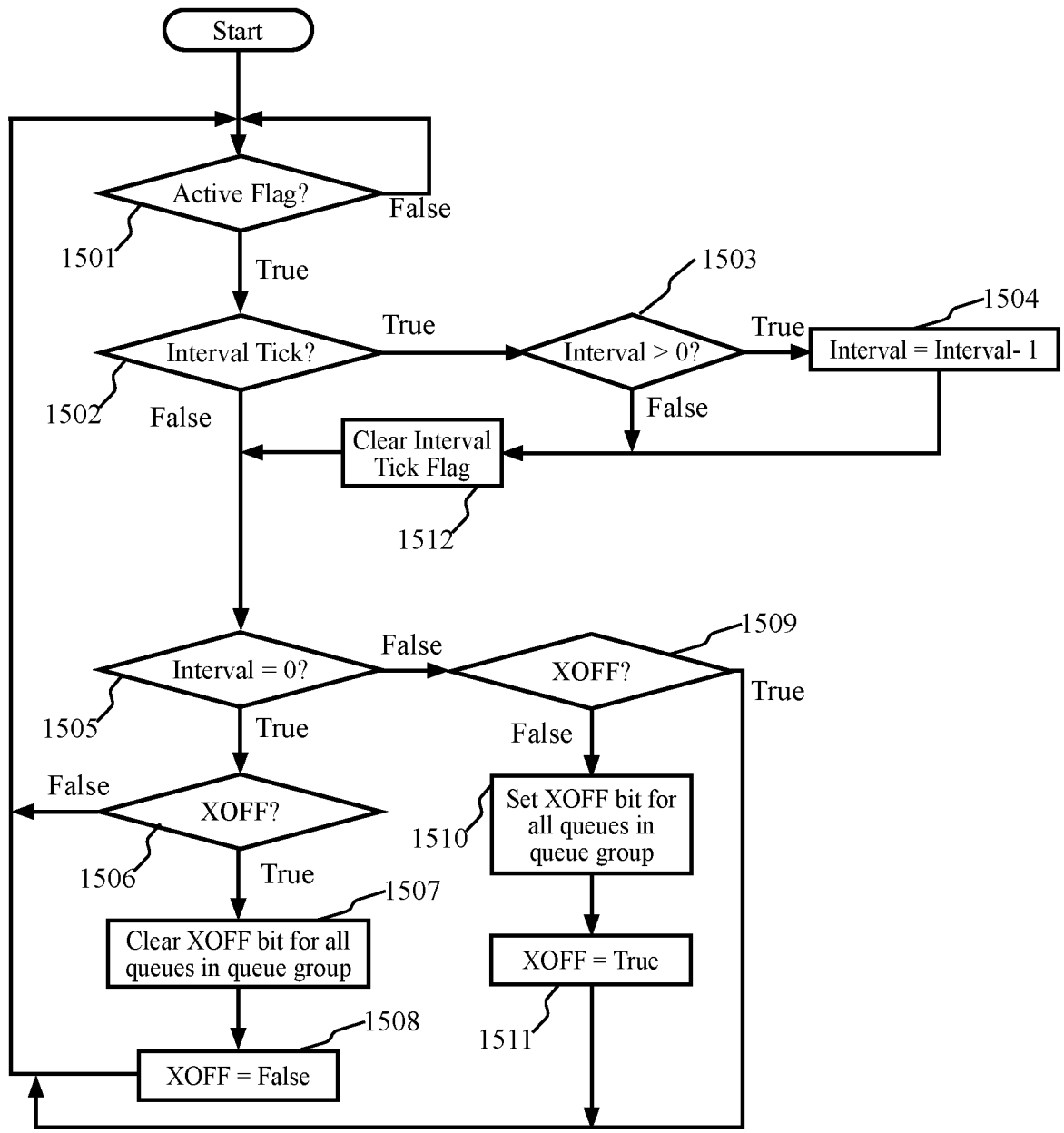
FIG. 15 is a high-level conceptual diagram of a process that can be implemented by a rate limiter circuit according to some aspects.

FIG. 15 is a high-level conceptual diagram of a process that can be implemented by a rate limiter circuit 1411 according to some aspects. After the start, at decision block 1501 the rate limiter circuit checks the active flag 1408. If the active flag is false, the rate limiter circuit loops back to checking the active flag at decision block 1501. If the active flag is true, the rate limiter circuit proceeds to decision block 1502. At decision block 1502 the rate limiter circuit checks the interval tick flag 1410. If the interval tick flag 1410 indicates that the interval tick flag is true, the rate limiter circuit moves to decision block 1503, otherwise the rate limiter circuit moves to decision block 1505. At decision block 1503, the rate limiter circuit checks if the intervals register 1406 is greater than zero. If the intervals register is less than zero then the rate limiter circuit moves to block 1512, otherwise the rate limiter circuit moves to block 1504. At block 1504, the intervals register 1406 is decremented by one before the rate limiter circuit moves to block 1512. At block 1512, the rate limiter circuit clears the interval tick flag then moves to decision block 1505. At decision block 1505, the rate limiter circuit checks if the intervals register 1406 equals zero. If the intervals register equals zero then the rate limiter circuit moves to decision block 1506, otherwise the rate limiter circuit moves to decision block 1509. At decision block 1509, the rate limiter circuit checks if the XOFF flag is true. If the XOFF flag is true then the rate limiter circuit loops back to decision block 1501, otherwise the rate limiter circuit moves to block 1510. At block 1510, the rate limiter circuit sets the XOFF bits for all the LIF queues indicated by the queue range registers 1403. At block 1511 the rate limiter circuit sets the XOFF flag to true, then loops back to decision block 1501. At decision block 1506, the rate limiter circuit checks if the XOFF flag is true. If the XOFF flag is false then the rate limiter circuit loops back to decision block 1501, otherwise the rate limiter circuit moves to block 1507. At block 1507, the rate limiter circuit clears the XOFF bits for all the LIF queues indicated by the queue range registers 1403. At block 1508, the rate limiter circuit sets the XOFF flag to false, then loops back to decision block 1501.

Figure 16:
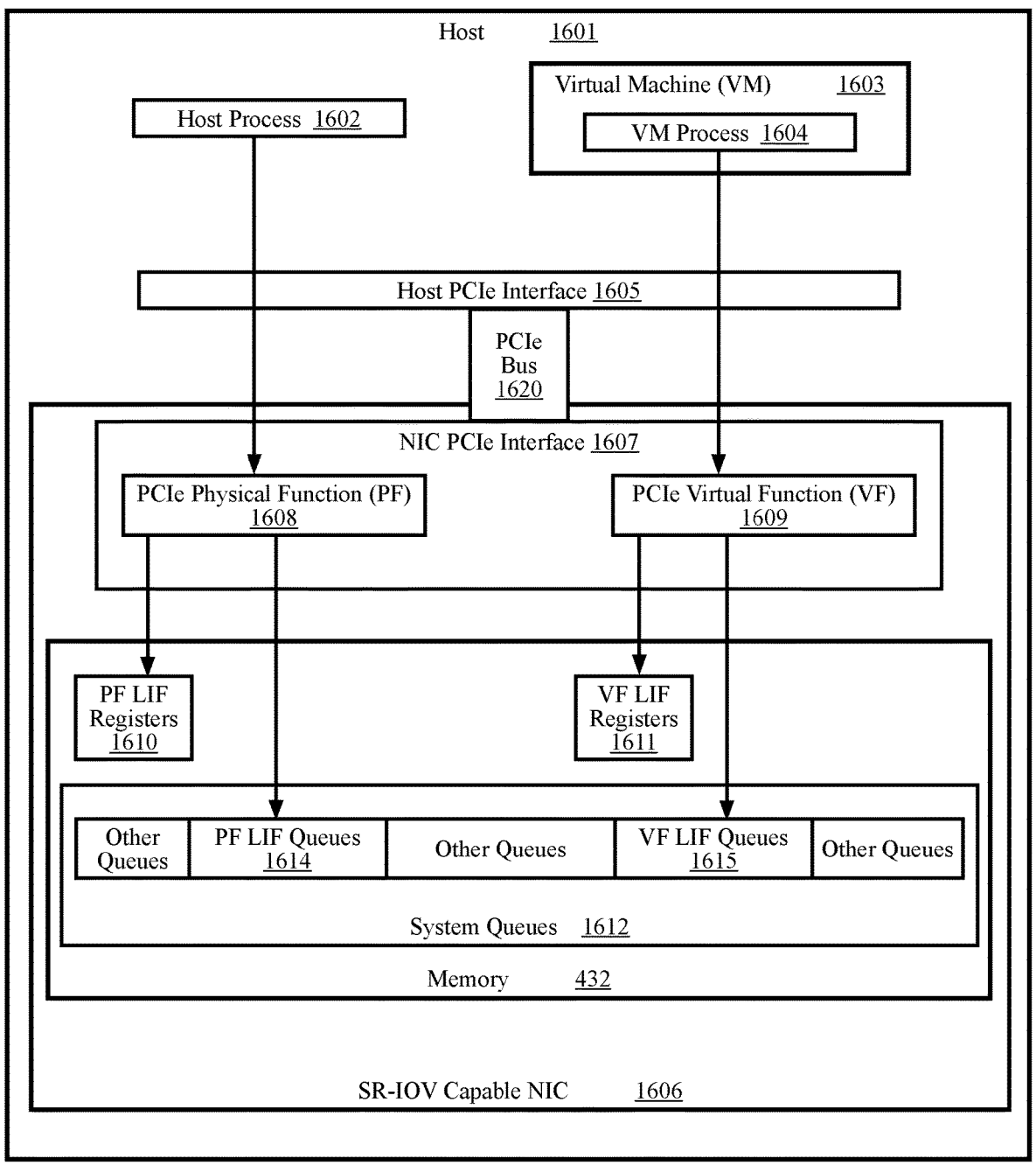
FIG. 16 is a high-level conceptual diagram of a single root input/output virtualization (SR-IOV) capable network interface card (NIC) that has logical interface (LIF) queues, and LIF registers for LIFs according to some aspects.

FIG. 16 is a high-level conceptual diagram of a single root input/output virtualization (SR-IOV) capable network interface card (NIC) 1606 that has logical interface (LIF) queues and LIF registers for LIFs according to some aspects. The NIC 1606 can be installed in a host 1601. The host can be a server that is running a host process 1602 and a virtual machine (VM) 1603. The virtual machine is running a VM process 1604. The host 1601 has a host PCIe interface 1605 connected to a PCIe bus 1620. The NIC has a NIC PCIe interface 1607 that is also connected to the PCIe bus 1620. The host 1601 and the NIC 1607 communicate with one another via the PCIe bus 1620. The NIC 1607 is implementing a PCIe physical function (PF) 1608 that can be used by the host process 1602. The NIC is also implementing a PCIe virtual function (VF) 1609 that can be used by the VM process 1604 running in the VM 1603. The PF 1608 and the VF 1609 can use LIF registers and LIF queues in the memory 432. The memory 432 can store the PF LIF registers 1610 for the PF 1608, the VF LIF registers 1611 for the VF 1609, and system queues 1612. The system queues 1612 can include the PF LIF queues 1614 for the PF 1608, and VF LIF queues 1615 for the VF. The scheduler 103 can service the PF LIF queues 1614 and the VF LIF queues 1615 by taking TRs from them, transforming the TRs into TR PHVs, and putting the TR PHVs on the second pipeline input queue 105, which may also be a queue that is stored in the memory 432. The rate limiter circuits can rate limit the host process by setting the XOFF bits for the PF LIF queues 1614. The rate limiter circuits can rate limit the VM 1603 by setting the XOFF bits for the VF LIF queues 1615.

Figure 17:
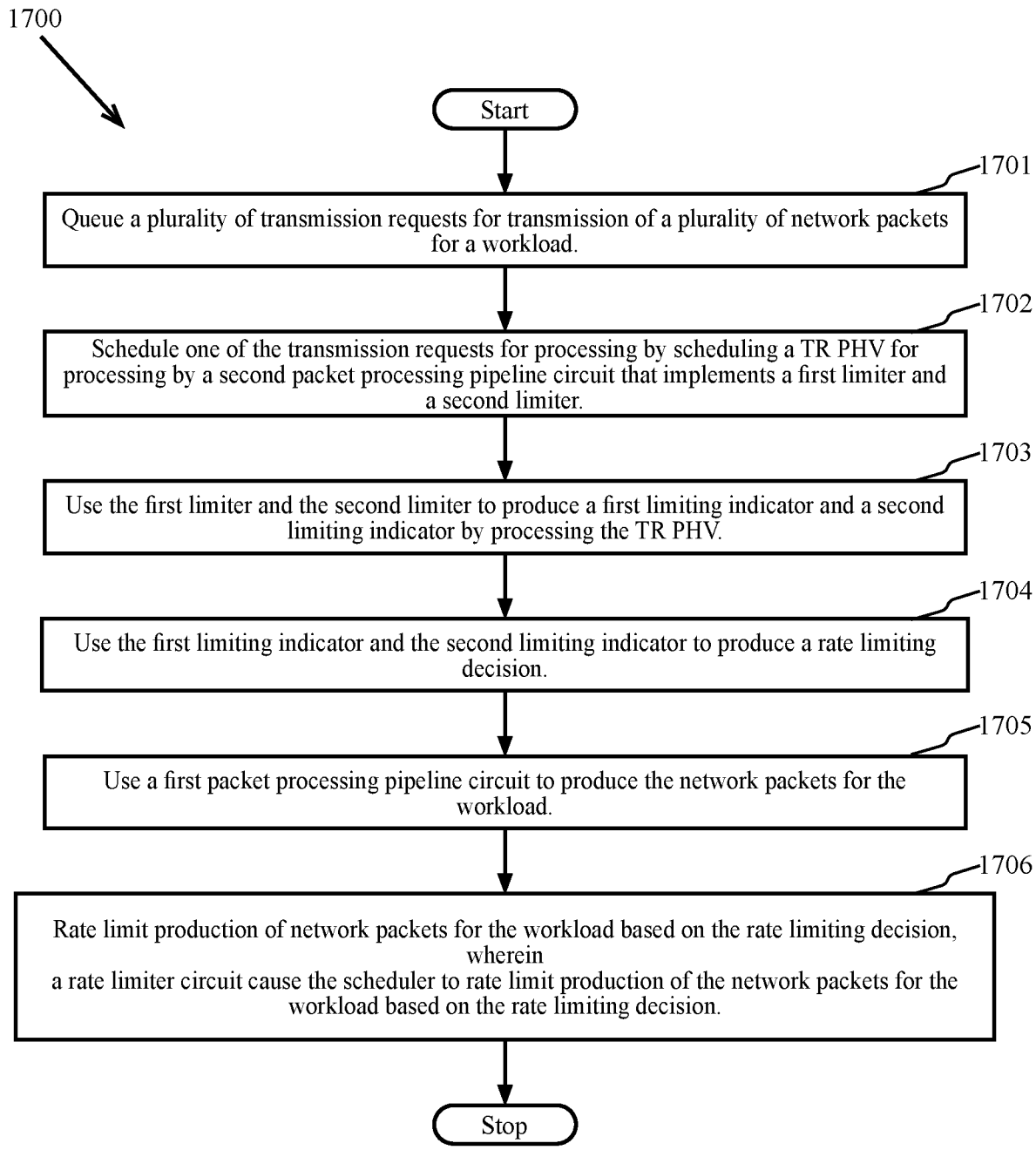
FIG. 17 is a high-level flow diagram illustrating a method for using a packet processing pipeline circuit to extend rate limiter circuit capabilities according to some aspects.

FIG. 17 is a high-level flow diagram illustrating a method for using a packet processing pipeline circuit to extend rate limiter circuit capabilities 1700 according to some aspects. After the start, at block 1701 the method can queue a plurality of transmission requests for transmission of a plurality of network packets for a workload. At block 1702 the method can schedule one of the transmission requests for processing by scheduling a TR PHV for processing by a second packet processing pipeline circuit that implements a first limiter and a second limiter. At block 1703 the method can use the first limiter and the second limiter to produce a first limiting indicator and a second limiting indicator by processing the TR PHV. At block 1704 the method can use the first limiting indicator and the second limiting indicator to produce a rate limiting decision. At block 1705 the method can use a first packet processing pipeline circuit to produce the network packets for the workload. At block 1706 the method can rate limit production of network packets for the workload based on the rate limiting decision, wherein a rate limiter circuit causes the scheduler to rate limit production of the network packets for the workload based on the rate limiting decision.

Aspects described above can be ultimately implemented in a network appliance that includes physical circuits that implement digital data processing, storage, and communications. The network appliance can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU and other semiconductor chip circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A system comprising:
 a first packet processing pipeline circuit that produces a plurality of network packets for a workload;
 a second packet processing pipeline circuit that includes a plurality of match-action processing stages arranged as a match-action pipeline;

a logical interface (LIF) that includes a LIF queue that stores a plurality of transmission requests for transmission of the network packets for the workload;
a scheduler that schedules one of the transmission requests for processing by scheduling a transmission request (TR) packet header vector (PHV) for processing by the second packet processing pipeline circuit;
a first limiter that is implemented by the second packet processing pipeline circuit and that produces a first limiting indicator by processing the TR PHV;
a second limiter that is implemented by the second packet processing pipeline circuit and that produces a second limiting indicator by processing the TR PHV;
a rate limit calculator that produces a rate limiting decision from the first limiting indicator and the second limiting indicator; and
a rate limiter circuit that, based on the rate limiting decision, causes the scheduler to limit scheduling of TR PHVs based on the transmission requests from the workload,
wherein the first packet processing pipeline circuit produces the network packets at a rate governed by the second packet processing pipeline circuit.

2. The system of claim 1, further including:
a first token bucket that indicates availability of a first networking resource for the workload; and
a second token bucket that indicates availability of a second networking resource for the workload;
wherein the first limiter uses the first token bucket to produce the first limiting indicator, and
wherein the second limiter uses the second token bucket to produce the second limiting indicator.

3. The system of claim 2, further including a metering circuit that adds tokens to the first token bucket at a first predetermined rate and adds tokens to the second token bucket at a second predetermined rate.

4. The system of claim 2, wherein:
the second packet processing pipeline circuit removes tokens from the first token bucket based on consumption of the first network resource by the workload; and
the second packet processing pipeline circuit removes tokens from the second token bucket based on consumption of the second network resource by the workload.

5. The system of claim 1, further including:
a central processing unit (CPU) that configures the second packet processing pipeline circuit to implement the first limiter, the second limiter, and the rate limit calculator.

6. The system of claim 1, wherein:
the second packet processing pipeline circuit includes a first match-action processing stage circuit, a second match-action processing stage circuit, and a third match-action processing stage circuit;
the first match-action processing stage circuit implements the first limiter and adds the first limiting indicator to the TR PHV;
the second match-action processing stage circuit implements the second limiter and adds the second limiting indicator to the TR PHV; and
the third match-action processing stage circuit implements the rate limit calculator.

7. The system of claim 6, wherein a fourth match-action processing stage of the second packet processing pipeline circuit writes rate limiting data from the rate limiting decision into the rate limiter circuit.

8. The system of claim 1, wherein:
the first limiter or the second limiter is an input/output operations per second (IOPS) rate limiter; and
the first limiter or the second limiter is a bandwidth limiter.

9. The system of claim 1, wherein the first packet processing pipeline circuit, the second packet processing pipeline circuit, and the rate limiter circuit are special purpose circuits in one or more semiconductor chips.

10. The system of claim 9, further including:
a network interface card (NIC) that includes the one or more semiconductor chips and a peripheral component interface express (PCIe) interface,
wherein the NIC is adapted for installation in a host computer, and
wherein the workload is a process running on the host computer that uses the PCIe interface to write the transmission requests into the LIF.

11. The system of claim 10, wherein:
the NIC uses single root input/output virtualization (SR-IOV) to implement a virtual function (VF); and
the workload is a virtual machine (VM) running on the host computer that uses the VF to write the transmission requests into the LIF.

12. The system of claim 10, wherein:
the NIC includes a memory that is outside of the one or more semiconductor chips and that stores a plurality of token buckets and the LIFs;
a first one of the token buckets indicates availability of a first networking resource for the workload;
a second one of the token buckets indicates availability of a second networking resource for the workload;
the first limiter uses the one of the token buckets to produce the first limiting indicator; and
the second limiter uses the second one of the token buckets to produce the second limiting indicator.

13. The system of claim 12, wherein:
the one or more semiconductor chips include a metering circuit; and
the metering circuit adds tokens to the token buckets at predetermined rates.

14. The system of claim 1, wherein the rate limiting circuit is one of a limited number of rate limiting circuits in a semiconductor chip.

15. A method comprising:
queueing a plurality of transmission requests for transmission of a plurality of network packets for a workload;
scheduling one of the transmission requests for processing by scheduling a TR PHV for processing by a second packet processing pipeline circuit that implements a first limiter and a second limiter;
using the first limiter and the second limiter to produce a first limiting indicator and a second limiting indicator by processing the TR PHV;
using the first limiting indicator and the second limiting indicator to produce a rate limiting decision;
using a first packet processing pipeline circuit to produce the network packets for the workload; and
rate limiting production of network packets for the workload based on the rate limiting decision,
wherein a rate limiter circuit causes the scheduler to rate limit production of the network packets for the workload based on the rate limiting decision.

16. The method of claim 15, wherein:
a first token bucket indicates availability of a first networking resource for the workload;

a second token bucket indicates availability of a second networking resource by the workload;

the first limiter uses the first token bucket to produce the first limiting indicator; and the second limiter uses the second token bucket to produce the second limiting indicator.

17. The method of claim 16, wherein:

a metering circuit adds tokens to the first token bucket at a first predetermined rate;

the metering circuit adds tokens to the second token bucket at a second predetermined rate;

the second packet processing pipeline circuit removes tokens from the first token bucket based on consumption of the first network resource by the workload; and the second packet processing pipeline circuit removes tokens from the second token bucket based on consumption of the second network resource by the workload.

18. The method of claim 15, wherein:

the second packet processing pipeline circuit includes a first match-action processing stage circuit, a second match-action processing stage circuit, and a third match-action processing stage circuit;

the first match-action processing stage circuit implements the first limiter and adds the first limiting indicator to the TR PHV;

the second match-action processing stage circuit implements the second limiter and adds the second limiting indicator to the TR PHV; and the third match-action processing stage circuit implements a rate limit calculator that produces the rate limiting decision.

19. A system comprising:

a means for queueing a plurality of transmission requests for transmission of a plurality of network packets for a workload;

a scheduling means for scheduling TR PHVs that are based on the transmission requests;

a first packet processing means that processes the TR PHVs using a plurality of rate metering means that produce a plurality of indicator means for indicating a need for rate limiting network packet production for the workload;

a decision means that uses the indicator means to produce a decision indication means for indicating whether production of the network packets for the workload is to be rate limited;

a hardware rate limiting means for governing production of the network packets based on decision indication means; and a second packet processing means for producing the network packets.

20. The system of claim 19, further comprising:

a first leaky bucket means for indicating availability of a first network resource for the workload; and a second leaky bucket means for indicating availability of a second network resource for the workload, wherein the plurality of rate metering means uses the first leaky bucket means and the second leaky bucket means to produce the plurality of indicator means.

* * * * *